United States Patent
Choi et al.

(10) Patent No.: US 7,805,961 B2
(45) Date of Patent: Oct. 5, 2010

(54) SUPERCOOLING APPARATUS OF SIMULTANEOUS COOLING AND HEATING TYPE MULTIPLE AIR CONDITIONER

(75) Inventors: Sung Oh Choi, Kyungki-do (KR); Seok Ho Yoon, Kyungki-do (KR); Young Min Park, Inchun-si (KR); Pil Hyun Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 639 days.

(21) Appl. No.: 11/287,391

(22) Filed: Nov. 28, 2005

(65) Prior Publication Data

US 2006/0137381 A1 Jun. 29, 2006

(30) Foreign Application Priority Data

Dec. 28, 2004 (KR) .................. 10-2004-0113568

(51) Int. Cl.
*F25B 40/00* (2006.01)
*F25B 39/02* (2006.01)
*F25B 13/00* (2006.01)
(52) U.S. Cl. ..................... 62/513; 62/324.6; 62/525
(58) Field of Classification Search ............... 62/324.1, 62/324.6, 513, 504, 525
See application file for complete search history.

(56) References Cited

U.S. PATENT DOCUMENTS

| | | | | |
|---|---|---|---|---|
| 243,759 A | * | 7/1881 | Cook ............................. 62/89 |
| 4,285,205 A | * | 8/1981 | Martin et al. .................. 62/113 |
| 4,987,747 A | * | 1/1991 | Nakamura et al. ............. 62/160 |
| 5,490,399 A | * | 2/1996 | Sada ............................ 62/510 |
| 5,987,916 A | * | 11/1999 | Egbert .......................... 62/498 |
| 7,406,839 B2 | * | 8/2008 | Bean et al. .................... 62/498 |
| 7,493,775 B2 | * | 2/2009 | Shimamoto et al. ........... 62/199 |
| 7,716,941 B2 | * | 5/2010 | Park et al. ..................... 62/277 |
| 2004/0139755 A1 | * | 7/2004 | Han Park et al. .............. 62/199 |
| 2004/0144111 A1 | | 7/2004 | Matsuoka |
| 2005/0016209 A1 | * | 1/2005 | Huelle .......................... 62/527 |
| 2006/0123835 A1 | * | 6/2006 | Takegami et al. ............. 62/498 |
| 2010/0101256 A1 | * | 4/2010 | Kawano et al. ............ 62/324.6 |

FOREIGN PATENT DOCUMENTS

| | | |
|---|---|---|
| EP | 0 496 505 | 7/1992 |
| EP | 1 278 022 | 1/2003 |
| EP | 1437 555 | 7/2004 |
| KR | 10-2004-0064453 A | 7/2004 |

* cited by examiner

*Primary Examiner*—Frantz F. Jules
*Assistant Examiner*—Alexis K Cox
(74) *Attorney, Agent, or Firm*—Birch, Stewart, Kolasch & Birch, LLP

(57) ABSTRACT

A supercooling apparatus of a simultaneous cooling and heating type multiple air conditioner comprises a liquid pipe header connected to outdoor heat exchangers, a plurality of branch liquid pipes branched from the liquid pipe header and connected to a plurality of indoor heat exchangers, respectively, and a supercooling mechanism mounted at least one of the branch liquid pipes for cooling refrigerant flowing to the indoor heat exchangers. The liquid refrigerant discharged from the heating-side indoor heat exchangers is supercooled by supercooling heat exchangers, and is then introduced into the cooling-side indoor heat exchangers. Consequently, noise generated from the cooling-side heat exchangers during the simultaneous cooling and heating operation is reduced, and cooling capacity of the multi air conditioner is improved.

9 Claims, 3 Drawing Sheets

SUPERCOOLING APPARATUS OF SIMULTANEOUS COOLING AND HEATING TYPE MULTIPLE AIR CONDITIONER

BACKGROUND OF THE INVENTION

1. Field of the Invention

The present invention relates to a simultaneous cooling and heating type multiple air conditioner, and, more particularly, to a supercooling apparatus of a simultaneous cooling and heating type multiple air conditioner, which is capable of reducing noise generated from cooling-side heat exchangers during a simultaneous cooling and heating operation and improving cooling capacity of the multi air conditioner.

2. Description of the Related Art

Generally, a simultaneous cooling and heating type air conditioner is a kind of multiple air conditioner. The simultaneous cooling and heating type air conditioner simultaneously performs cooling and heating operations to individually cool or heat rooms where indoor units of the air conditioner are installed.

Specifically, the simultaneous cooling and heating type air conditioner is constructed such that, when one or more rooms are to be heated, the indoor units installed at the corresponding rooms are operated in heating mode, and, at the same time, when one or more rooms are to be cooled, the indoor units installed at the corresponding rooms are operated in cooling mode.

FIG. 1 is a circuit diagram showing a conventional simultaneous cooling and heating type multiple air conditioner operated in main cooling mode.

As shown in FIG. 1, the conventional simultaneous cooling and heating type multiple air conditioner comprises an outdoor unit A, a distributor B, and a plurality of indoor units C.

In the outdoor unit A are mounted compressors 1, outdoor heat exchangers 2, a four-way valve 3, and an accumulator 8.

Between the outdoor unit A and the indoor units C are connected high-pressure pipes 20, 20a, 20b, and 20c, through which high-pressure refrigerant flows, low-pressure pipes 21, 21a, 21b, and 21c, through which low-pressure refrigerant flows, and liquid pipes 22, 22a, 22b, and 22c. The high-pressure pipes 20, 20a, 20b, and 20c, the low-pressure pipes 21, 21a, 21b, and 21c, and the liquid pipes 22, 22a, 22b, 22c extend through the distributor B. On the high-pressure pipes 20a, 20b, and 20c are mounted high-pressure valves 30a, 30b, and 30c, respectively. On the low-pressure pipes 21a, 21b, and 21c are mounted low-pressure valves 31a, 31b, and 31c, respectively.

In the indoor units C are mounted indoor heat exchangers 50a, 50b, and 50c, and electronic expansion valves 55a, 55b, and 55c, respectively.

The conventional simultaneous cooling and heating type multiple air conditioner controls the four-way valve 3, the high-pressure valves 30a, 30b, and 30c, and the low-pressure valves 31a, 31b, and 31c, based on operation mode, such as full cooling mode, main cooling mode, full heating mode, or main heating mode, to simultaneously or individually perform cooling and heating operations.

FIG. 1 shows the main cooling operation of the conventional simultaneous cooling and heating type multiple air conditioner. As shown in FIG. 1, refrigerant discharged from the compressors 1 flows to the liquid pipe 22 through the outdoor heat exchangers 2. At the same time, the refrigerant flows to the high-pressure pipe 20. The refrigerant passing through the outdoor heat exchangers 2 flows through the electronic expansion valves 55a and 55b and the indoor heat exchangers 50a and 50b to cool the rooms where the corresponding indoor units are installed. Subsequently, the refrigerant flows to the compressors 1 through the low-pressure valves 31a and 31b, the low-pressure pipes 21a, 21b, and 21, and the accumulator 8. On the other hand, the refrigerant passing through the high-pressure pipe 20 flows through the high-pressure valve 30c, which is opened, and the indoor heat exchanger 50c to heat the room where the corresponding indoor unit is installed. Subsequently, the refrigerant passing through the indoor heat exchanger 50c joins the refrigerant flowing to the indoor heat exchangers 50a and 50b, and then flows through the indoor heat exchangers 50a and 50b to assist the cooling of the rooms. Thereafter, the refrigerant flows to the compressors 1.

When the conventional simultaneous cooling and heating type multiple air conditioner is operated in the full cooling mode, i.e., when all the indoor units C are operated in the cooling mode, supercooled liquid is supplied from the outdoor heat exchangers 2 to the indoor heat exchangers 50a, 50b, and 50c. Consequently, noise is not generated. When the conventional simultaneous cooling and heating type multiple air conditioner is operated in the main cooling mode, i.e., when at least one of the indoor units C is operated in the heating mode, on the other hand, not only heating-side indoor heat exchanger 50c but also the outdoor heat exchangers 2 servos serve as a condenser.

In this case, supercooling may be insufficient depending on the outdoor temperature surrounding the heating-side indoor heat exchanger 50c, and insufficiently supercooled liquid refrigerant may be introduced into the cooling-side indoor heat exchangers 50a and 50b.

When the insufficiently supercooled liquid refrigerant is introduced into the cooling-side indoor heat exchangers 50a and 50b, however, severe noise may be generated due to rapid flow speed of the saturated liquid refrigerant. According to circumstances, a large number of bubbles may be generated, and the bubbles prevent smooth flow of the liquid refrigerant. Consequently, the cooling capacity of the conventional simultaneous cooling and heating type multiple air conditioner is lowered.

SUMMARY OF THE INVENTION

Therefore, the present invention has been made in view of the above problems, and it is an object of the present invention to provide a supercooling apparatus of a simultaneous cooling and heating type multiple air conditioner, which is capable of reducing noise generated from cooling-side heat exchangers during a simultaneous cooling and heating operation and preventing reduction in cooling capacity of the multi air conditioner.

In accordance with one aspect of the present invention, the above and other objects can be accomplished by the provision of a supercooling apparatus of a simultaneous cooling and heating type multiple air conditioner, comprising: a liquid pipe header connected to outdoor heat exchangers; a plurality of branch liquid pipes branched from the liquid pipe header and connected to a plurality of indoor heat exchangers, respectively; and a supercooling mechanism mounted at least one of the branch liquid pipes for cooling refrigerant flowing to the indoor heat exchangers.

Preferably, the supercooling mechanism is constructed such that heat exchange is performed between the refrigerant that is extracted from the liquid pipe header and expanded into low temperature and low pressure and the refrigerant passing through the branch liquid pipes.

Preferably, the supercooling mechanism comprises: supercooling pipes connected to the a low-pressure pipe at the inlet side of a compressors from the liquid pipe header; a supercooling expansion valve mounted on the supercooling pipes for expanding the refrigerant; and supercooling heat exchangers for performing heat exchange between the supercooling pipes and the branch liquid pipes, respectively.

Preferably, the supercooling heat exchangers are mounted at the branch liquid pipes, respectively.

The supercooling pipes include a main supercooling pipe connected to the liquid pipe header and branch supercooling pipes branched to the supercooling heat exchangers and connected to the low-pressure pipe. Preferably, the supercooling expansion valve is mounted on the main supercooling pipe.

Preferably, the supercooling expansion valve is an electronic expansion valve, which is opened when a simultaneous cooling and heating operation is performed.

Preferably, the supercooling heat exchangers is constructed in a pipe-in-pipe structure in which the branch liquid pipes or the branch supercooling pipes are partially disposed in the branch supercooling pipes or the branch liquid pipes, respectively.

In accordance with another aspect of the present invention, there is provided a supercooling apparatus of a simultaneous cooling and heating type multiple air conditioner, comprising: an outdoor unit having compressors, outdoor heat exchangers, a four-way valve, and an accumulator; a plurality of indoor units each having an indoor heat exchanger and an electronic expansion valve; a distributor disposed between the outdoor unit and the indoor units such that high-pressure pipes, low-pressure pipes, and liquid pipes, through which refrigerant flows, extend through the distributor, the liquid pipes including a main liquid pipe and branch liquid pipes; a liquid pipe header mounted in the distributor, the liquid pipe header being disposed between the main liquid pipe connected to the outdoor heat exchangers and the branch liquid pipes connected to the indoor heat exchangers, respectively; and a supercooling mechanism mounted at the branch liquid pipes for cooling refrigerant flowing to the cooling-side indoor heat exchangers from the heating-side indoor heat exchangers when a simultaneous cooling and heating operation is performed.

According to the present invention, the liquid refrigerant discharged from the heating-side indoor heat exchanger is supercooled by the supercooling heat exchangers, and is then introduced into the cooling-side indoor heat exchangers. Consequently, the present invention has the effect of reducing noise generated from the cooling-side heat exchangers during the simultaneous cooling and heating operation and improving cooling capacity of the multi air conditioner.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
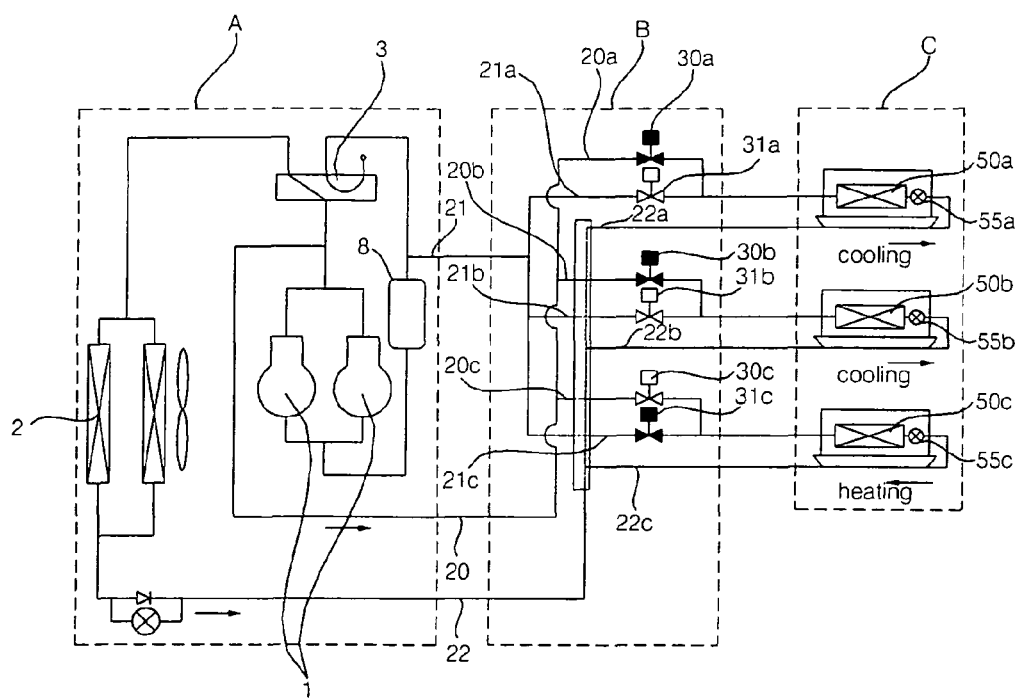
FIG. 1 is a circuit diagram showing the construction of a conventional simultaneous cooling and heating type multiple air conditioner.
Figure 2:
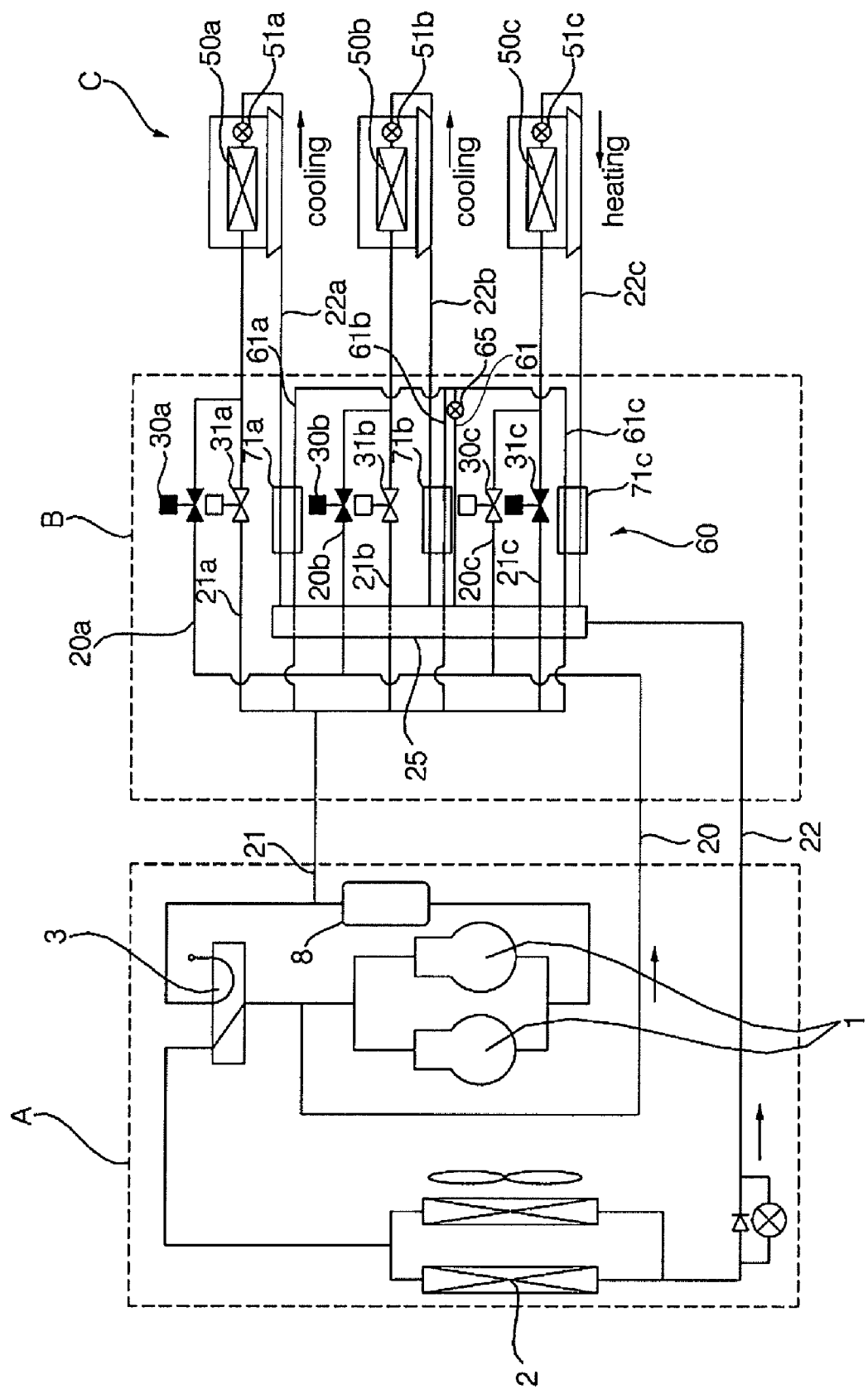
FIG. 2 is a circuit diagram showing the construction of a simultaneous cooling and heating type multiple air conditioner incorporating a supercooling apparatus according to the present invention.
Figure 3:
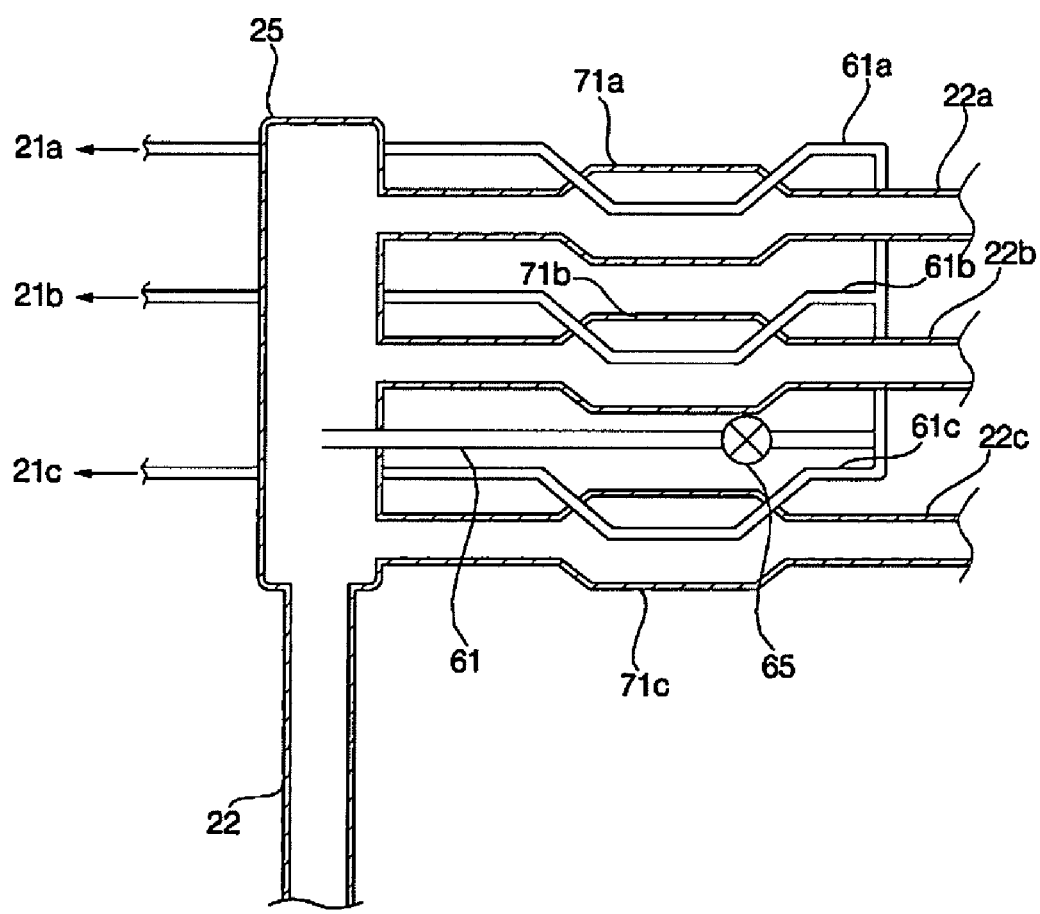
FIG. 3 is a view showing the construction of main components of the supercooling apparatus according to the present invention.

FIG. 2 is a circuit diagram showing the construction of a simultaneous cooling and heating type multiple air conditioner incorporating a supercooling apparatus according to the present invention, and FIG. 3 is a view showing the construction of main components of the supercooling apparatus according to the present invention.

It should be noted that components of the simultaneous cooling and heating type multiple air conditioner according to the present invention, which are identical or similar in construction to those of the conventional simultaneous cooling and heating type multiple air conditioner, are indicated by the same reference numerals as those of the conventional simultaneous cooling and heating type multiple air conditioner, and a detailed description thereof will not be given. In the following description, the simultaneous cooling and heating type multiple air conditioner includes three indoor units, although the simultaneous cooling and heating type multiple air conditioner may include two indoor units or more than three indoor units.

As shown in FIG. 2, the simultaneous cooling and heating type multiple air conditioner according to the present invention comprises an outdoor unit A, a distributor B, and a plurality of indoor units C.

In the outdoor unit A are mounted compressors 1, outdoor heat exchangers 2, a four-way valve 3, and an accumulator 8.

Between the outdoor unit A and the indoor units C are connected high-pressure pipes 20, 20a, 20b, and 20c, low-pressure pipes 21, 21a, 21b, and 21c, and liquid pipes 22, 22a, 22b, and 22c, through which refrigerant flows. The high-pressure pipes 20, 20a, 20b, and 20c, the low-pressure pipes 21, 21a, 21b, and 21c, and the liquid pipes 22, 22a, 22b, 22c extend through the distributor B. On the high-pressure pipes 20a, 20b, and 20c are mounted high-pressure valves 30a, 30b, and 30c, respectively. On the low-pressure pipes 21a, 21b, and 21c are mounted low-pressure valves 31a, 31b, and 31c, respectively.

In the indoor units C are mounted indoor heat exchangers 50a, 50b, and 50c, and electronic expansion valves 55a, 55b, and 55c, respectively.

In the distributor B is mounted a liquid pipe header 25, which is disposed between the main liquid pipe 22 connected to the outdoor heat exchangers 2 and the branch liquid pipes 22a, 22b, and 22c connected to the indoor heat exchangers 50a, 50b, and 50c, respectively.

At the branch liquid pipes 22a, 22b, and 22c is mounted a supercooling mechanism 60, which cools the refrigerant flowing to the cooling-side indoor heat exchangers from the heating-side indoor heat exchanger when a simultaneous cooling and heating operation is performed. Preferably, the supercooling mechanism 60 is mounted at each of the branch liquid pipes 22a, 22b, and 22c, although the supercooling mechanism 60 may be mounted at only a required branch liquid pipe(s) according to circumstances.

The supercooling mechanism 60 is constructed such that heat exchange is performed between the refrigerant that is extracted from the liquid pipe header 25 and expanded into low temperature and low pressure and the refrigerant passing through the branch liquid pipes 22a, 22b, and 22c. As shown in FIG. 3, the supercooling mechanism 60 comprises: supercooling pipes 61, 61a, 61b, and 61c connected to the inlet-side low-pressure pipe 21 from the liquid pipe header 25; a supercooling expansion valve 65 mounted on the supercooling pipes 61, 61a, 61b, and 61c for expanding the refrigerant; and supercooling heat exchangers 71a, 71b, and 71c for performing heat exchange between the supercooling pipes 61a, 61b, and 61c and the branch liquid pipes 22a, 22b, and 22c, respectively.

The supercooling pipes 61, 61a, 61b, and 61c include: a main supercooling pipe 61 connected to the liquid pipe header 25; and branch supercooling pipes 61a, 61b, and 61c branched to the supercooling heat exchangers 71a, 71b, and 71c and connected to the low-pressure pipe 21.

Preferably, the supercooling expansion valve 65 is mounted on the main supercooling pipe 61. Also preferably, the supercooling expansion valve 65 is an electronic expansion valve, which is opened when the simultaneous cooling and heating operation is performed.

Preferably, the supercooling heat exchangers 71a, 71b, and 71c are mounted at the branch liquid pipes 22a, 22b, and 22c, respectively. The supercooling heat exchangers 71a, 71b, and 71c is constructed in a pipe-in-pipe structure in which the branch liquid pipes 22a, 22b, and 22c or the branch supercooling pipes 61a, 61b, and 61c are partially disposed in the branch supercooling pipes 61a, 61b, and 61c or the branch liquid pipes 22a, 22b, and 22c, respectively. In the illustrated embodiment, the branch supercooling pipes 61a, 61b, and 61c are disposed in the enlarged portions of the branch liquid pipes 22a, 22b, and 22c, respectively.

It should be noted that, however, the supercooling heat exchangers 71a, 71b, and 71c may be constructed in various structures so long as the supercooling heat exchangers 71a, 71b, and 71c perform heat exchange between the branch liquid pipes 22a, 22b, and 22c and the branch supercooling pipes 61a, 61b, and 61c.

Now, the operation of the supercooling apparatus of the simultaneous cooling and heating type multiple air conditioner with the above-stated construction according to the present invention will be described.

Referring to FIG. 2, when a main cooling operation is performed, refrigerant discharged from the compressors 1 flows to the liquid pipe 22 through the outdoor heat exchangers 2. At the same time, the refrigerant flows to the high-pressure pipe 20. The refrigerant passing through the outdoor heat exchangers 2 flows through the liquid pipe header 25, the electronic expansion valves 55a and 55b, and the indoor heat exchangers 50a and 50b to cool the rooms where the corresponding indoor units are installed. Subsequently, the refrigerant flows to the compressors 1 through the low-pressure valves 31a and 31b, the low-pressure pipes 21a, 21b, and 21, and the accumulator 8.

On the other hand, the refrigerant passing through the high-pressure pipe 20 flows through the high-pressure valve 30c, which is opened, and the indoor heat exchanger 50c to heat the room where the corresponding indoor unit is installed. Subsequently, the refrigerant passing through the indoor heat exchanger 50c flows to the liquid pipe header 25, at which refrigerant passing through the indoor heat exchanger 50c joins the refrigerant flowing to the indoor heat exchangers 50a and 50b, and then flows through the indoor heat exchangers 50a and 50b to assist the cooling of the rooms.

The liquid refrigerant flowing to the branch liquid pipe 22c from the heating-side indoor heat exchanger 50c is supercooled by the supercooling mechanism 60, and the supercooled liquid refrigerant flows to the cooling-side indoor heat exchangers 50a and 50b.

When the supercooling expansion valve 65 is opened while the simultaneous cooling and heating operation, i.e., the main heating operation or the main cooling operation, is performed, some of the liquid refrigerant passing through the liquid pipe header 25 flows through the supercooling pipe 61. As a result, the liquid refrigerant is expanded, and therefore, the temperature and the pressure of the liquid refrigerant are lowered. The expanded refrigerant, i.e., the low-temperature and low-pressure refrigerant, passes through the supercooling heat exchangers 71a, 71b, and 71c, at which heat exchange between the low-temperature and low-pressure refrigerant and the refrigerant flowing through the branch liquid pipes 22a, 22b, and 22c is performed. In this way, the supercooling operation is performed.

The liquid refrigerant flowing through the heating-side indoor heat exchanger 50c is primarily supercooled by the low-temperature liquid refrigerant while passing through the supercooling heat exchanger 71c, and is then introduced into the liquid pipe header 25. Subsequently, the liquid refrigerant passes through the supercooling heat exchangers 71a and 71b. As a result, the liquid refrigerant is secondarily supercooled by the supercooling heat exchangers 71a and 71b, and is then introduced into the cooling-side indoor heat exchangers 50a and 50b.

In this way, sufficiently supercooled refrigerant is introduced into the cooling-side indoor heat exchangers 50a and 50b. Consequently, noise, which is generated due to introduction of the saturated liquid refrigerant in the conventional simultaneous cooling and heating type multiple air conditioner, is considerably reduced. Furthermore, the cooling capacity of the simultaneous cooling and heating type multiple air conditioner is increased.

Meanwhile, the refrigerant directly introduced into the cooling-side indoor heat exchangers 50a and 50b from the outdoor heat exchangers 2 through the liquid pipe header 25 also passes through the supercooling heat exchangers 71a and 71b. As a result, the liquid refrigerant is supercooled by the supercooling heat exchangers 71a and 71b, and therefore, more stable supply of the supercooled liquid refrigerant is accomplished.

As apparent from the above description, the liquid refrigerant discharged from the heating-side indoor heat exchanger is supercooled by the supercooling heat exchangers, and is then introduced into the cooling-side indoor heat exchangers. Consequently, the present invention has the effect of reducing noise generated from the cooling-side heat exchangers during the simultaneous cooling and heating operation and improving cooling capacity of the multi air conditioner.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A supercooling apparatus of a simultaneous cooling and heating type multiple air conditioner, comprising:
   a low-pressure pipe connected to an inlet side of a compressor;
   a liquid pipe header connected to an outlet side of an outdoor heat exchanger;
   a plurality of branch liquid pipes branched from the liquid pipe header and connected to a plurality of indoor heat exchangers, respectively; and
   a supercooling device configured to cool refrigerant passing through the branch liquid pipes,
   wherein the supercooling device comprises:
   a main supercooling pipe having one end connected to the liquid pipe header;

a supercooling expansion valve configured to expand the refrigerant passing through the main supercooling pipe;

branch supercooling pipes branched from an other end of the main supercooling pipe and connected to the low-pressure pipe, each branch supercooling pipe having no additional expansion element of any kind; and supercooling heat exchangers mounted at each of the branch liquid pipes to perform heat exchange such that the refrigerant passing through the branch liquid pipes is cooled by performing heat exchange with the refrigerant passing through the branch supercooling pipes.

2. The supercooling apparatus as set forth in claim 1, wherein the supercooling expansion valve is mounted on the main supercooling pipe.

3. The supercooling apparatus as set forth in claim 1, wherein the supercooling expansion valve is an electronic expansion valve, which is opened when a simultaneous cooling and heating operation is performed.

4. The supercooling apparatus as set forth in claim 1, wherein the supercooling heat exchangers are constructed in a pipe-in-pipe structure in which the branch liquid pipes or the branch supercooling pipes are partially disposed in the branch supercooling pipes or the branch liquid pipes, respectively.

5. A supercooling apparatus of a simultaneous cooling and heating type multiple air conditioner, comprising:

an outdoor unit having a compressor, an outdoor heat exchanger, a four-way valve, and an accumulator;

a plurality of indoor units each having an indoor heat exchanger and an electronic expansion valve;

a distributor disposed between the outdoor unit and the indoor units such that high-pressure pipes, low-pressure pipes, and liquid pipes, through which refrigerant flows, extend through the distributor, the liquid pipes including a main liquid pipe and branch liquid pipes;

a liquid pipe header mounted in the distributor, the liquid pipe header being disposed between the main liquid pipe connected to the outdoor heat exchanger and the branch liquid pipes connected to the indoor heat exchangers, respectively; and a supercooling device configured to cool refrigerant flowing to the cooling-side indoor heat exchangers from the heating-side indoor heat exchangers when a simultaneous cooling and heating operation is performed, the supercooling device comprising:

a main supercooling pipe having one end connected to the liquid pipe header, a supercooling expansion valve configured to expand the refrigerant passing through the main supercooling pipe;

branch supercooling pipes branched from an other end of the main supercooling pipe and connected to the low-pressure pipe, and supercooling heat exchangers for performing heat exchange between the branch supercooling pipes and the branch liquid pipes.

6. The supercooling apparatus as set forth in claim 5, wherein the supercooling heat exchangers are mounted at the branch liquid pipes, respectively.

7. The supercooling apparatus as set forth in claim 5, wherein the supercooling expansion valve is mounted on the main supercooling pipe.

8. The supercooling apparatus as set forth in claim 5, wherein the supercooling expansion valve is an electronic expansion valve, which is opened when a simultaneous cooling and heating operation is performed.

9. The supercooling apparatus as set forth in claim 5, wherein the supercooling heat exchangers are constructed in a pipe-in-pipe structure in which the branch liquid pipes or the branch supercooling pipes are partially disposed in the branch supercooling pipes or the branch liquid pipes, respectively.

* * * * *